No. 77,954.                                   PATENTED MAY 19, 1868.
H. BROCARD.
PACKING FOR JOINTS OF STEAM AND WATER PIPES.
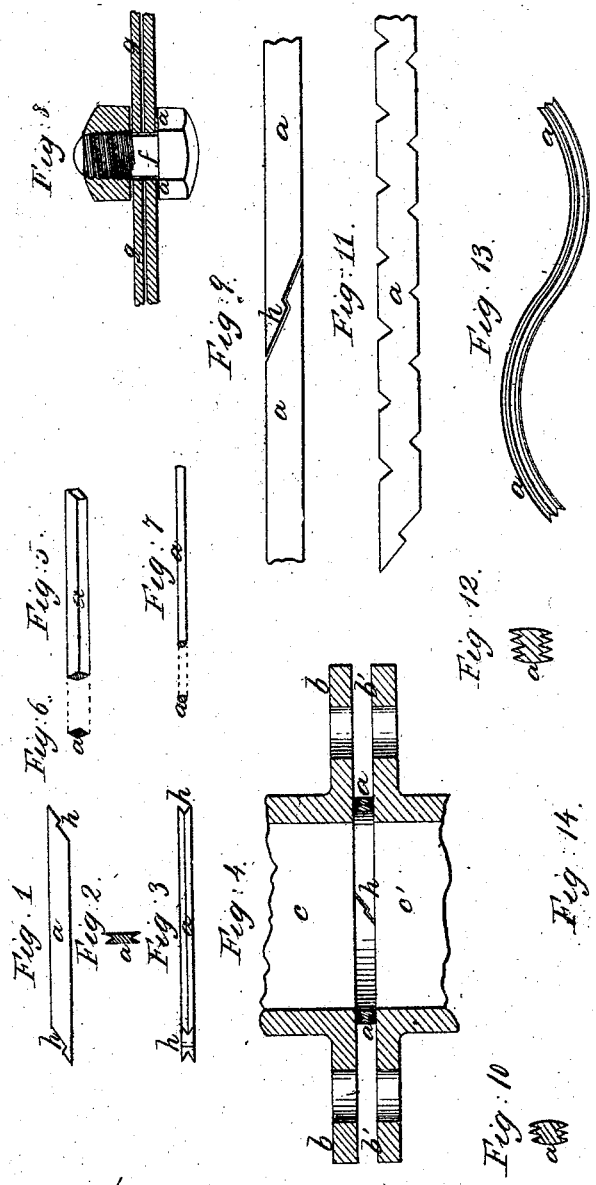

United States Patent Office.

HYPPOLYTE BROCARD, OF PARIS, FRANCE.

Letters Patent No. 77,954, dated May 19, 1868.

IMPROVED PACKING FOR JOINTS OF STEAM AND WATER-PIPES.

*The Schedule referred to in these Letters Patent and making part of the same.*

TO ALL WHOM IT MAY CONCERN:

Be it known that I, HYPPOLYTE BROCARD, of Paris, in the Empire of France, have invented certain new and useful Improvements in Washers, or means of making the joints of metal pipes and other metal articles tight; and I hereby declare that the following is a full, clear, and exact description of the same, reference being had to the accompanying drawings.

This invention consists in the employment of washers or packings of lead, shaped in rolls, with longitudinal grooves, and placed between the surfaces to be joined. These washers being subjected to pressure, the lead yields, and impresses itself with the surfaces united by the compression of the tightening-agents used, so as to follow exactly the more or less irregular conformation of the said surfaces. A joint perfectly hermetic is thus constituted, without the use of white lead and yarn.

For some purposes, the lead washer is formed from a strip of lead, the cross-section of which is that of a lozenge; and again, for some purposes, the washer is in the form of wire. The edges of the washer should be scarfed, in order that they may fit together when bent into a circular or oval form.

Figures 1, 2, and 3 of the accompanying drawings, represent several views of a strip of lead, $a$, formed with grooves.

This strip, placed between the flanges $b\ b'$ of two pipes $c\ c'$ to be connected, (see Figure 4,) preserves, before being compressed, its original configuration; but if the flanges $b\ b'$ be tightened, or brought closer together, by screws or bolts, the strip $a$ yields, and the lead, owing to its great malleability, and favored also by the longitudinal grooves of the strip, impresses itself into the surfaces of the flanges, following exactly their more or less irregular conformation.

The strip of lead is shaped, by hand or otherwise, according to the configuration of the joint, and the ends are cut as represented at $h$, figs. 1 and 3, in order that they may fit together when bent into a circular or other form.

In some cases I form the strip of lead of lozenge-shape, in section, as represented in Figures 5 and 6, and without grooves. This configuration is particularly adapted for valve-boxes.

To make a hermetic connection between a bolt or screw, $f$, Figure 8, and a plate, $g$, I take a thin strip or wire of lead, similar to that shown in Figure 7, the malleability of which is such that it can be readily rolled round the plain portion of the bolt or screw, to obtain by compression a tight connection.

In the formation of the lead washers by moulding, they may be made either straight or sinuous, or of circular or oval form. Instead of the continuous rectangular edges of the grooves, the edges of the washers may be formed with notches or otherwise, according to the purpose to which they are to be applied. The number of grooves may also be varied, (see Figures 9 and 10, and Figures 11 and 12.)

Figure 13 shows a washer of sinuous form,

Figure 14 a circular, and

Figure 15 an oval washer.

The forms of washers shown in the drawings are merely given as examples. Many other forms may be conveniently adopted, the form being chiefly dependent upon the purpose to which the washer is to be applied.

And having now described the nature of the said invention, and in what manner the same is to be performed, I declare that I claim—

The employment, as means of making the joints of metal pipes and other metal articles tight, of washers or packings of lead, rolled, substantially in the manner hereinbefore described.

In testimony whereof, I have signed my name to this specification before two subscribing witnesses.

H. BROCARD.

Witnesses:
A. RICORDEAU,
EDWARD HUNNIBOLT.